(12) United States Patent
Yamaguchi et al.

(10) Patent No.: US 11,169,068 B2
(45) Date of Patent: Nov. 9, 2021

(54) PARTICLE SIZE DISTRIBUTION MEASUREMENT DEVICE AND PROGRAM FOR A PARTICLE SIZE DISTRIBUTION MEASUREMENT DEVICE

(71) Applicant: HORIBA, Ltd., Kyoto (JP)

(72) Inventors: Tetsuji Yamaguchi, Kyoto (JP); Keijiro Sakuramoto, Kyoto (JP); Tetsuya Mori, Kyoto (JP); Hirosuke Sugasawa, Kyoto (JP)

(73) Assignee: HORIBA, LTD., Kyoto (JP)

( * ) Notice: Subject to any disclaimer, the term of this patent is extended or adjusted under 35 U.S.C. 154(b) by 427 days.

(21) Appl. No.: 16/341,758

(22) PCT Filed: Oct. 11, 2017

(86) PCT No.: PCT/JP2017/036794
§ 371 (c)(1),
(2) Date: Apr. 12, 2019

(87) PCT Pub. No.: WO2018/070411
PCT Pub. Date: Apr. 19, 2018

(65) Prior Publication Data
US 2021/0293686 A1  Sep. 23, 2021

(30) Foreign Application Priority Data
Oct. 14, 2016 (JP) .............................. JP2016-202200

(51) Int. Cl.
*G01N 15/02* (2006.01)
*G01N 15/00* (2006.01)

(52) U.S. Cl.
CPC . *G01N 15/0211* (2013.01); *G01N 2015/0053* (2013.01)

(58) Field of Classification Search
CPC ........... G01N 15/0205; G01N 15/0211; G01N 15/1459; G01N 2021/4716; G01N 15/1434
(Continued)

(56) References Cited

U.S. PATENT DOCUMENTS

2003/0139886 A1* 7/2003 Bodzin ................. G01N 21/47
702/28
2008/0137080 A1* 6/2008 Bodzin ................. G01N 21/49
356/300

FOREIGN PATENT DOCUMENTS

JP 2000-046719 A 2/2000
JP 2000-046722 A 2/2000
(Continued)

OTHER PUBLICATIONS

International Search Report dated Jan. 16, 2018 for International Application No. PCT/JP2017/036794 and English translation.

*Primary Examiner* — Md M Rahman
(74) *Attorney, Agent, or Firm* — Lucas & Mercanti, LLP

(57) ABSTRACT

A particle size distribution measurement device contains a specific particle size light intensity calculation unit that calculates a light intensity generated by particles having a specific particle size that are contained in an object, a correlation data storage unit that stores particle number-light intensity correlation data, and a particle number calculation unit that calculates the number of particles having a specific particle size that are contained in the object being measured based on light intensities calculated by the specific particle size light intensity calculation unit, and on the particle number-light intensity correlation data.

8 Claims, 11 Drawing Sheets

(58) Field of Classification Search
USPC .......................................................... 356/336
See application file for complete search history.

(56) References Cited

FOREIGN PATENT DOCUMENTS

| | | |
|---|---|---|
| JP | 2001-033375 A | 2/2001 |
| JP | 2007-263876 A | 10/2007 |
| JP | 2008-122208 A | 5/2008 |
| JP | 2008-164539 A | 7/2008 |
| JP | 2011-085465 A | 4/2011 |
| JP | 2013-160514 A | 8/2013 |

* cited by examiner

PARTICLE SIZE DISTRIBUTION MEASUREMENT DEVICE AND PROGRAM FOR A PARTICLE SIZE DISTRIBUTION MEASUREMENT DEVICE

CROSS REFERENCE TO RELATED APPLICATION

This Application is a 371 of PCT/JP2017/036794 filed on Oct. 11, 2017 which, in turn, claimed the priority of Japanese Patent Application No. 2016-202200 filed on Oct. 14, 2016, both applications are incorporated herein by reference.

TECHNICAL FIELD

The present invention relates to a particle size distribution measurement device, and to a program for a particle size distribution measurement device.

TECHNICAL BACKGROUND

Conventionally, as is shown in Patent Document 1, a particle size distribution measurement device is known that irradiates light onto particles contained in an object being measured, and then calculates the particle size distribution of the particles based on light intensity distributions of diffracted light and scattered light (hereinafter, referred to on occasion as diffracted/scattered light) generated by this irradiation.

The particle size distribution calculated by this particle size distribution measurement device is displayed on a graph showing what proportion of the total particles is formed by particles having a particular particle size, with one axis showing the particle size and the other axis showing the percentage. In other words, this particle size distribution shows the relative particle number of particles having a particular particle size.

In recent years, a desire has arisen to learn a correlation between an absolute particle number of particles contained in an object being measured, and, for example, an effect obtained from that object being measured. Consequently, there is a need to be able to measure absolute particle numbers such as the number of particles within a certain volumetric space of an object being measured, or the number of particles per unit volume (i.e., a number density) thereof.

One method used to measure an absolute particle number involves counting particles in an object being measured using a microscope or the like, however, if there is a need to measure particle numbers precisely, then in order to guard against statistical errors, it is necessary to count particles in the order of tens of thousands, which takes a substantial amount of time. In addition, if the particles are so small that they cannot be confirmed using a microscope or the like, then this method cannot be employed.

DOCUMENTS OF THE PRIOR ART

Patent Documents

[Patent Document 1] Japanese Unexamined Patent Application (JP-A) No. 2008-122208

DISCLOSURE OF THE INVENTION

Problems to be Solved by the Invention

The present invention was conceived in view of the above-described circumstances, and it is a principal object thereof to provide a particle size distribution measurement device that is capable of determining an absolute number of particles having a particular particle size that are contained in an object being measured.

Means for Solving the Problem

In other words, a particle size distribution measurement device according to the present invention is a particle size distribution measurement device that irradiates light onto a particles serving as an object being measured, and calculates a particle size distribution of the particles based on a light intensity signal that shows a light intensity of diffracted/scattered light therefrom, and that includes a specific particle size light intensity calculation unit that calculates a light intensity generated by particles having a specific particle size that are contained in the object being measured based on an actual light intensity distribution obtained from the light intensity signal, and on a theoretical light intensity distribution calculated from the particle size, a correlation data storage unit that stores particle number-light intensity correlation data which is data obtained using a plurality of known samples in which the number of particles having a specific particle size is known, and which shows a correlation between the number of particles having a specific particle size that are contained in each of the known samples, and integrated values of the light intensity distributions obtained from each of the known samples, and a particle number calculation unit that calculates the number of particles having a specific particle size that are contained in the object being measured based on light intensities calculated by the specific particle size light intensity calculation unit, and on the particle number-light intensity correlation data.

According to the particle size distribution measurement device having the above-described structure, because particle number-light intensity correlation data showing correlations between numbers of particles and integrated values of light intensity distributions is determined in advance using known test samples, it is possible to calculate the number of particles having a specific particle size that are contained in an object being measured based on this particle number-light intensity correlation data, and on the light intensity generated by the particles having the specific particle size that are contained in the object being measured.

It is preferable that there be provided a distribution conversion unit that, based on the number of particles having a specific particle size calculated by the particle number calculation unit, converts the particle size distribution from a distribution in which the numbers of particles of each particle size contained in the object being measured are shown in relative terms to a distribution in which the numbers of these particles are shown in absolute terms.

If this type of structure is employed, by confirming a distribution showing the number of particles of each particle size in absolute terms, it is possible to ascertain the overall number of particles of each particle size contained in an object being measured.

It should be noted that even if particle number-light intensity correlation data is determined in advance using a known test sample of, for example, 500 nm, if no 500 nm particles are contained in the object being measured, then it is not possible to calculate the number of particles in absolute terms using particle number-light intensity correlation data.

For this reason, it is preferable for the correlation data storage unit to store the particle number-light intensity correlation data obtained for each one of a plurality of different types of particle size.

If this type of structure is employed, because particle number-light intensity correlation data is determined in advance for each one of a plurality of different types of particle size, if at least one of these particle sizes matches the particle size of particles contained in the object being measured, then it is possible to calculate particle numbers in absolute terms using particle number light intensity correlation data that corresponds to that particle size.

Because the shape of a light intensity distribution changes if the refractive index thereof changes, if the refractive index changes then the correlation between an integrated value of the light intensity distribution and the number of particles also changes.

For this reason, it is preferable for there to be further provided a correlation data correction unit that, based on a theoretical light intensity distribution calculated using the particle sizes and refractive indexes of the known samples, and on a theoretical light intensity distribution calculated using the same particle sizes as the known samples, but using different refractive indexes therefrom, corrects the particle number-light intensity correlation data.

If this type of structure is employed, because the correlation data correction unit corrects particle number-light intensity correlation data in accordance with refractive indexes, even if the refractive index of the object being measured is different from the refractive index of the known sample, it is still possible to calculate a number of particles using appropriate particle number-light intensity correlation data that has been corrected in accordance with the refractive index of the object being measured. As a result, any difference between the number of particles having a particular particle size contained in an object being measured and the number of particles calculated for that particular particle size can be minimized.

A specific example of an object being measured is foam particles contained in a liquid.

Moreover, a program for a particle size distribution measurement device according to the present invention is a program that is installed in a particle size distribution measurement device that irradiates light onto a particles serving as an object being measured, and calculates a particle size distribution of the particles based on a light intensity signal that shows a light intensity of diffracted/ scattered light therefrom, wherein the program causes a computer to perform functions of a specific particle size light intensity calculation unit that calculates a light intensity generated by particles having a specific particle size that are contained in the object being measured based on an actual light intensity distribution obtained from the light intensity signal, and on a theoretical light intensity distribution calculated from the particle size, a correlation data storage unit that stores particle number-light intensity correlation data which is data obtained using a plurality of known samples in which the number of particles having a specific particle size is known, and which shows a correlation between the number of particles having a specific particle size that are contained in each of the known samples, and integrated values of the light intensity distributions obtained from each of the known samples, and a particle number calculation unit that calculates the number of particles having a specific particle size that are contained in the object being measured based on light intensities calculated by the specific particle size light intensity calculation unit, and on the particle number-light intensity correlation data.

According to this type of program for a particle size distribution measurement device, it is possible to achieve the same type of operation and effects as those obtained from the above-described particle size distribution measurement device.

In addition, a particle size distribution measurement device according to the present invention is a particle size distribution measurement device that irradiates light onto a particles serving as an object being measured, and calculates a particle size distribution of the particles based on a light intensity signal that shows a light intensity of diffracted/ scattered light therefrom, and that includes a specific particle size light intensity calculation unit that calculates a light intensity generated by particles having a specific particle size that are contained in the object being measured based on an actual light intensity distribution obtained from the light intensity signal, and on a theoretical light intensity distribution calculated from the particle size, a correlation data storage unit that stores particle number-light intensity correlation data which is data obtained using a plurality of known samples in which the number of particles having a specific particle size is known, and which shows a correlation between the number of particles having a specific particle size that are contained in each of the known samples, and a light intensity of a specific spread angle in a light intensity distribution obtained from each of the known samples, and a particle number calculation unit that calculates the number of particles having a specific particle size that are contained in the object being measured based on light intensities calculated by the specific particle size light intensity calculation unit, and on the particle number-light intensity correlation data.

Furthermore, a program for a particle size distribution measurement device according to the present invention is a program that is installed in a particle size distribution measurement device that irradiates light onto a particles serving as an object being measured, and calculates a particle size distribution of the particles based on a light intensity signal that shows a light intensity of diffracted/ scattered light therefrom, wherein the program causes a computer to perform functions of a specific particle size light intensity calculation unit that calculates a light intensity generated by particles having a specific particle size that are contained in the object being measured based on an actual light intensity distribution obtained from the light intensity signal, and on a theoretical light intensity distribution calculated from the particle size, a correlation data storage unit that stores particle number-light intensity correlation data which is data obtained using a plurality of known samples in which the number of particles having a specific particle size is known, and which shows a correlation between the number of particles having a specific particle size that are contained in each of the known samples, and a light intensity of a specific spread angle in a light intensity distribution obtained from each of the known samples, and a particle number calculation unit that calculates the number of particles having a specific particle size that are contained in the object being measured based on light intensities calculated by the specific particle size light intensity calculation unit, and on the particle number-light intensity correlation data.

According to this type of particle size distribution measurement device and program for a particle size distribution measurement device, because particle number-light intensity correlation data showing a correlation between a number of particles and a light intensity of a specific spread angle is determined in advance using a known sample, it is possible to calculate the number of particles having a specific particle size that are contained in an object being measured based on this particle number-light intensity correlation data, and on the light intensity generated by the particles having a specific particle size contained in the object being measured.

Effects of the Invention

According to the present invention having the above-described structure, it is possible to calculate the number of particles having a specific particle size that are contained in an object being measured, and to consequently obtain a particle size distribution that shows in absolute terms the number of particles of each particle size that are contained in the object being measured.

DESCRIPTION OF THE REFERENCE NUMERALS

100 . . . Particle Size Distribution Measurement Device
X . . . Object Being Measured
21 . . . Actual Light Intensity Distribution Acquisition Unit
22 . . . Ideal Light Intensity Distribution Storage Unit
23 . . . Particle Size Distribution Calculation Unit
24 . . . Correlation Data Storage Unit
25 . . . Specific Particle Size Light Intensity Calculation Unit
26 . . . Particle Number Calculation Unit
27 . . . Distribution Conversion Unit
28 . . . Correlation Data Correction Unit Best Embodiments for Implementing the Invention Hereinafter, an embodiment of a particle size distribution measurement device according to the present invention will be described with reference to the drawings.

A particle size distribution measurement device 100 according to the present embodiment measures a particle size distribution by utilizing the fact that a light intensity distribution that corresponds to a spread angle of the diffracted/scattered light which is generated when light is irradiated onto particles is determined by the size of the particles using MIE scattering theory and Fraunhofer diffraction theory and the like, and detecting this diffracted/scattered light. Examples of an object X being measured include pharmaceuticals, food products, and chemical industry products and the like, however, here, foam particles contained in a liquid are used for the object X being measured.

Figure 1:
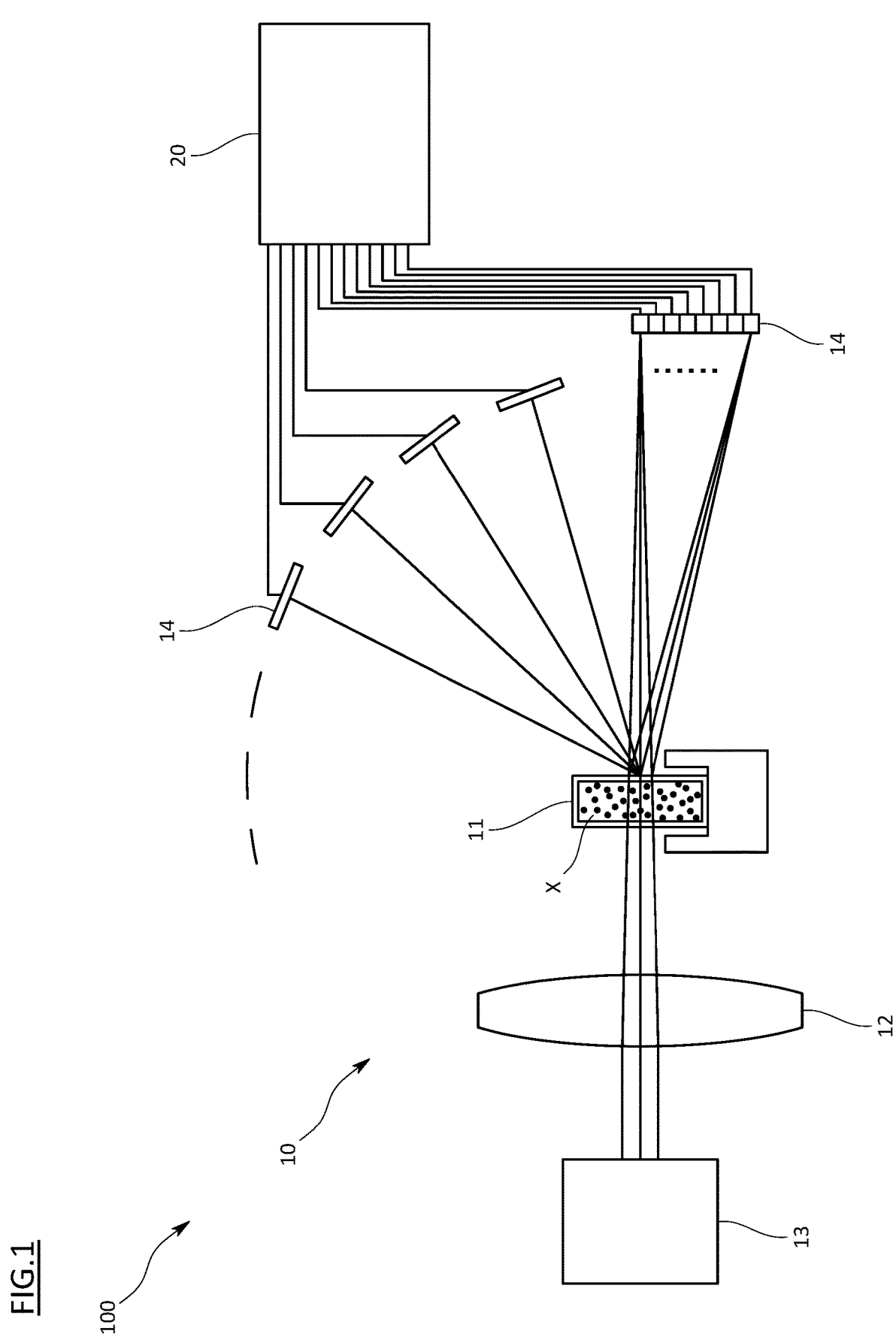
FIG. 1 is a schematic view showing a particle size distribution measurement device according to an embodiment of the present invention.

As is shown in a typical view in FIG. 1, the particle size distribution measurement device 100 is provided with a device main body 10 and a computation device 20.

The device main body 10 is provided with a cell 11 that contains a particles which is serving as the object X being measured, a laser device formed by a light source 13 that irradiates laser light via a lens 12 onto the particles inside the cell 11, and a plurality of photodetectors 14 that detect the light intensity of the diffracted/scattered light generated by the laser light irradiation in accordance with the spread angle thereof.

Note that, in the present embodiment, a batch-type cell is used for the cell 11, however, a circulatory-type cell may be used instead.

The computation device 20 is formed, in physical terms, by a general-purpose or dedicated computer that is provided with a CPU, memory, an input/output interface and the like, and receives light intensity signals output from the respective photodetectors 14 which it then uses to calculate a particle size distribution.

Figure 2:
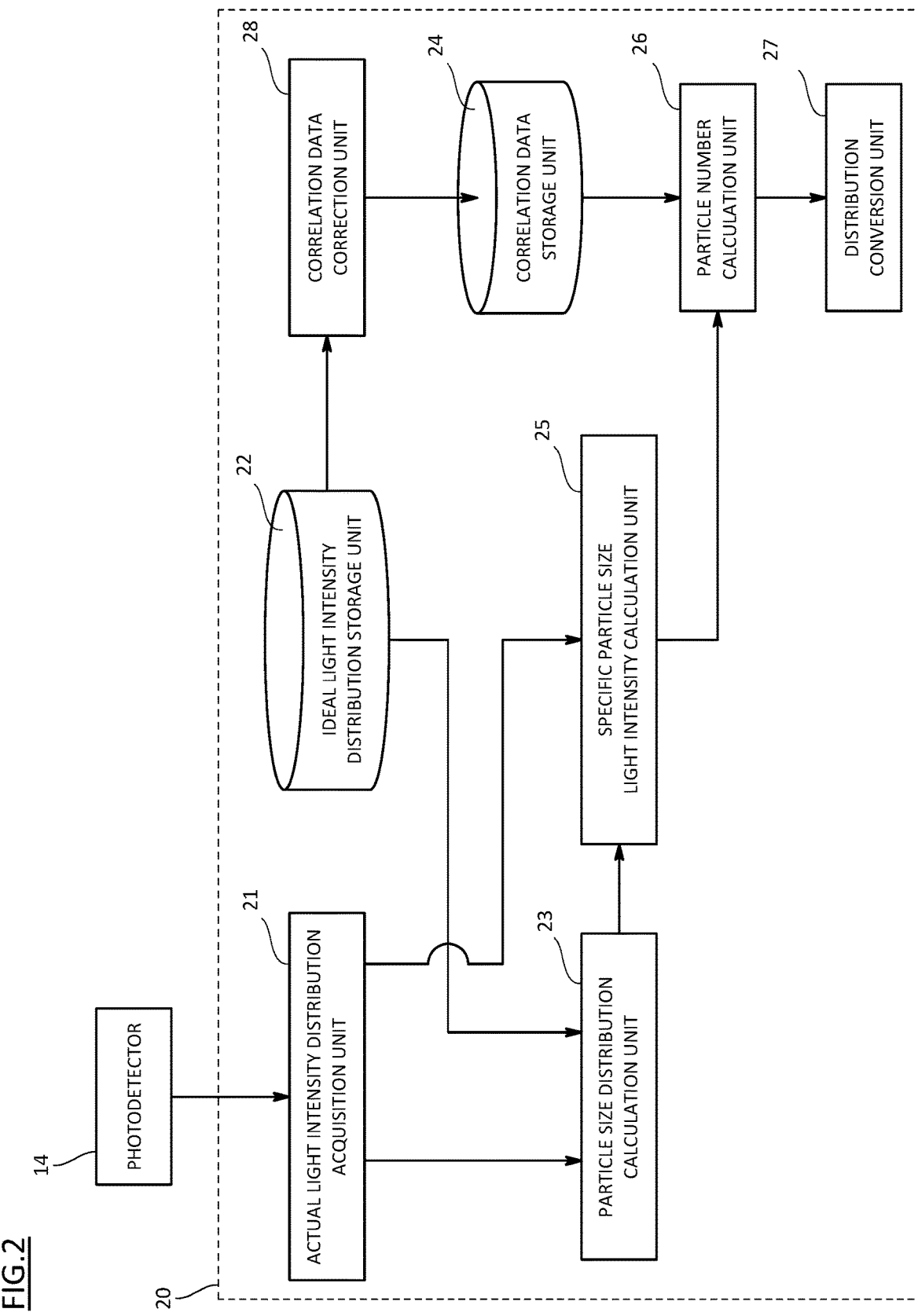
FIG. 2 is a function block diagram showing a function structure of a computation device according to the same embodiment.

As is shown in FIG. 2, this computation device 20 is provided with functions of an actual light intensity distribution acquisition unit 21, an ideal light intensity distribution storage unit 22, and a particle size distribution calculation unit 23. The computation device 20 achieves these functions by causing the CPU and peripheral devices to operate in mutual collaboration in accordance with a predetermined program which is stored in a predetermined area of the memory.

Figure 3:
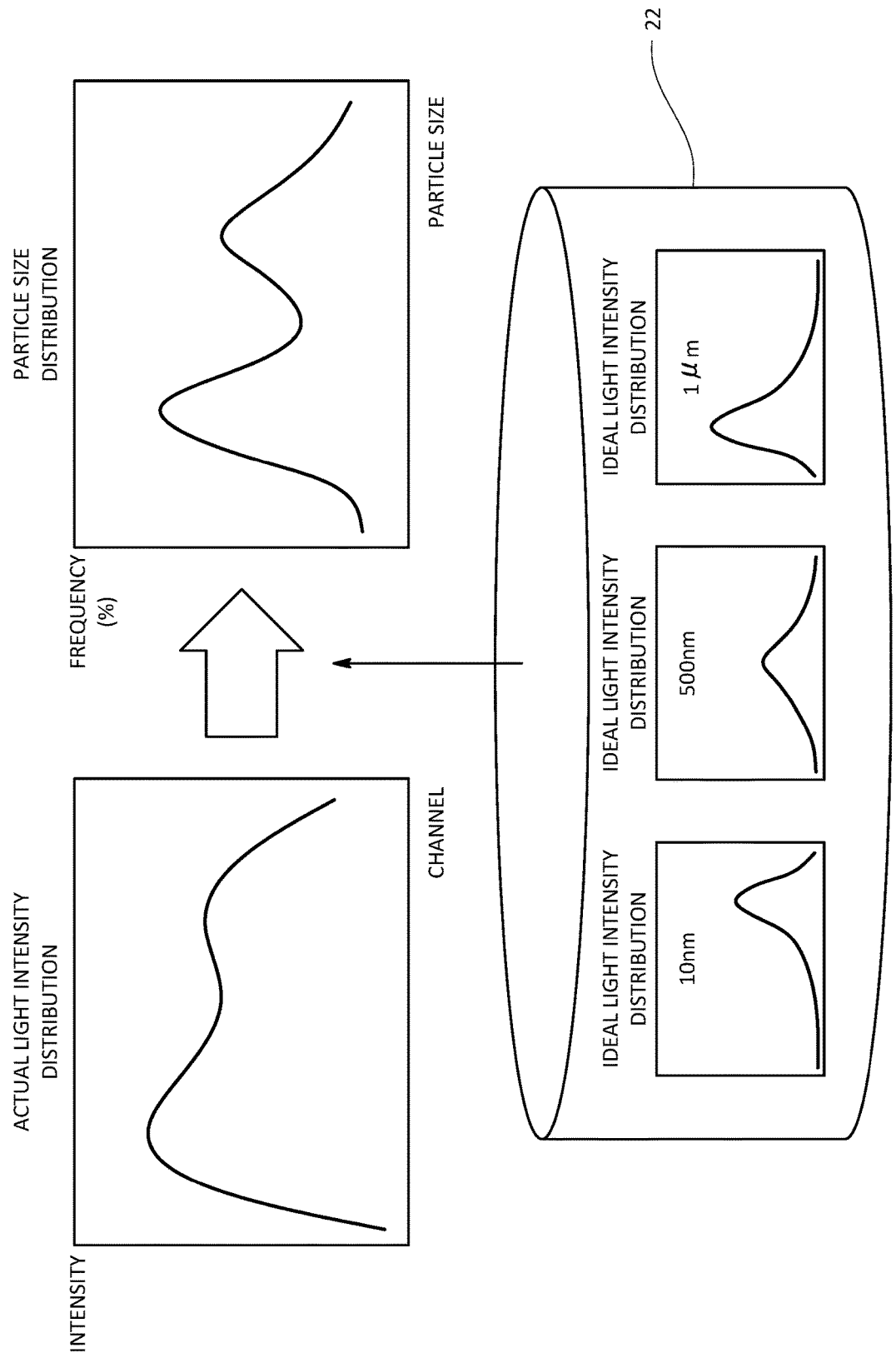
FIG. 3 is a typical view illustrating an actual light intensity distribution and a particle size distribution according to the same embodiment.

The actual light intensity distribution acquisition unit 21 receives light intensity signals output from the respective photodetectors 14, and acquires actual light intensity distribution data that, as is shown in FIG. 3, shows the light intensity distribution in the channels of the respective photodetectors 14, namely, the light intensity distribution for the spread angles of the diffracted/scattered light.

As is shown in FIG. 3, the ideal light intensity distribution storage unit 22 stores ideal light intensity distribution data that shows an ideal light intensity distribution that should be obtained when light is irradiated onto a particles made up of particles having the same particle diameter. This ideal light intensity distribution is calculated based on a predetermined calculation formula (i.e., theoretical formula) using at least the particle sizes, and may be calculated in advance using a different information processing device from the computation unit 20. Alternatively, the computation device 20 may be provided with the function of calculating the ideal light intensity distribution.

The ideal light intensity distribution storage unit 22 of the present embodiment stores the respective data sets for each ideal light intensity distribution calculated for each of a plurality of types of particle size. Here, in order to simplify the description, it is assumed that ideal light intensity distribution data sets calculated for at least particle sizes of 10 nm, 500 nm, and 1 µm are stored.

The particle size distribution calculation unit 23 calculates particle size distribution data that shows the particle size distribution of the particles forming the object X being measured based on the actual light intensity distribution data acquired by the actual light intensity distribution data acquisition unit 21, and on the plurality of ideal light intensity distribution data sets stored in the ideal light intensity distribution storage unit 22.

As is shown in FIG. 3, this particle size distribution shows the proportion of the entire particle swarm occupied by particles having a particular particle size (hereinafter, this may also referred be to as the frequency), and is expressed on a graph of which one axis is set to the particle size, and the other axis is set to the frequency. Here, the frequency is shown as a percentage, in other words, the particle size distribution can be said to show in relative terms the number of particles of each particle size.

In this way, as is shown in FIG. 2, the computation device 20 of the present embodiment is further provided with the functions of a correlation data storage unit 24, a specific particle size light intensity calculation unit 25, a particle number calculation unit 26, and a distribution conversion unit 27.

Figure 4:
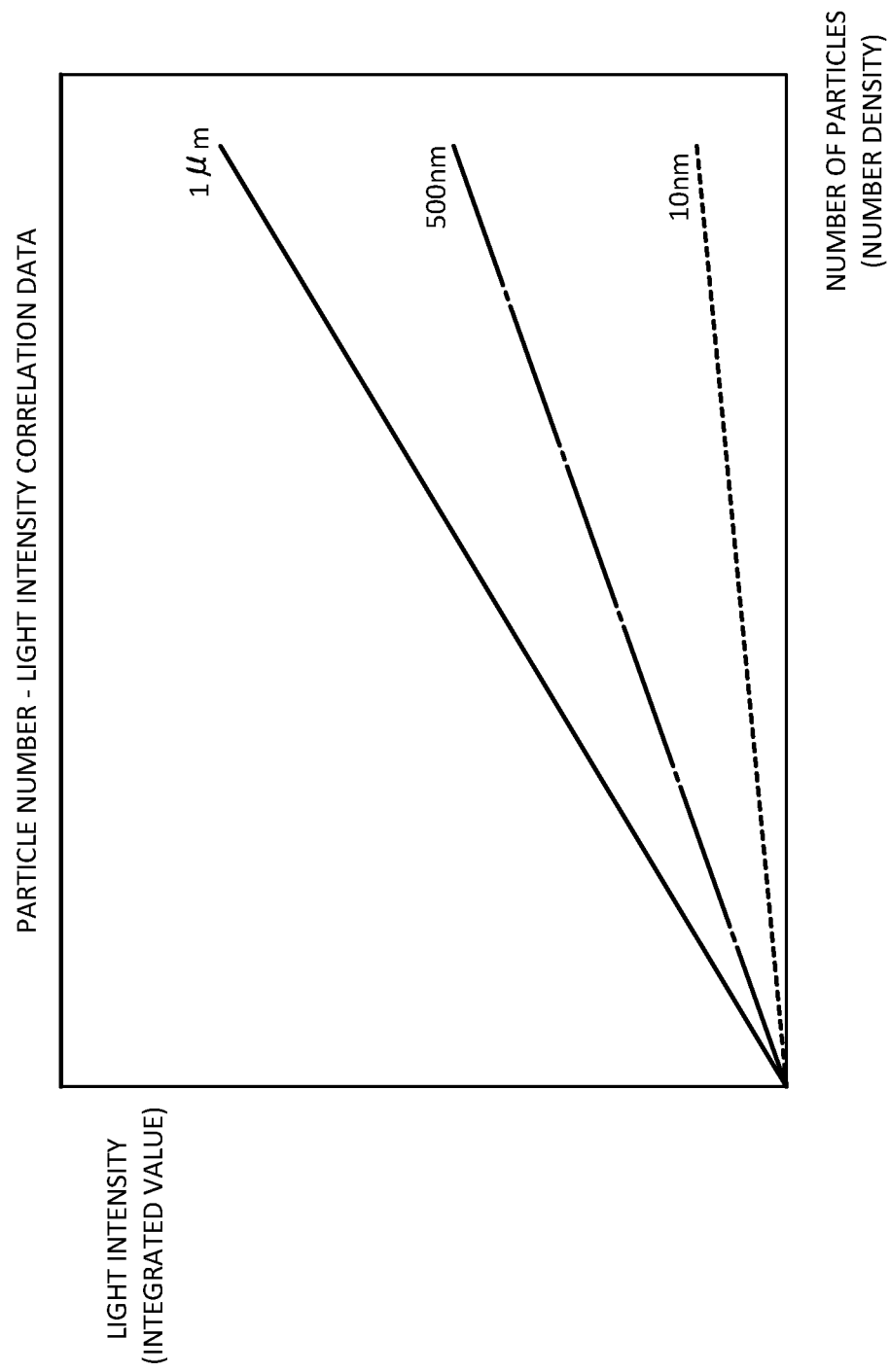
FIG. 4 is a typical view illustrating particle number-light intensity correlation data according to the same embodiment.

As is shown in FIG. 4, the correlation data storage unit 24 stores particle number-light intensity correlation data that shows a correlation between integrated values of the light intensity distributions obtained when light is irradiated onto a plurality of existing test samples that are formed by particles having the same particle size, but that each have a mutually different number of particles contained therein, and the number of particles of each known test sample (here, this is a number density is expressed as [number/ml]). More specifically, the particle number-light intensity correlation data is in the form of calibration curves obtained by plotting the integrated values of the light intensity distributions for each particle number.

The known test samples are monodispersed test samples in which the particle sizes of the particles contained therein have been uniformized to a certain extent. Here, for example, polystyrene latex (PSL) in which the number of particles contained therein per unit volume (i.e., the number density) is known, and the particle sizes have been uniformized is used for the known test sample. In other words, the aforementioned calibration curves are created by preparing a plurality of monodispersed test samples having the same particle size, but having mutually different numbers of particles contained therein, and then irradiating light onto these test samples, and plotting the integrated values of the obtained light intensity distributions on a graph for each number of particles.

The particle number-light intensity correlation data is determined in advance via experiment or the like, and is then stored in the correlation data storage unit 24. The correlation data storage unit 24 of the present exemplary embodiment stores particle number-light intensity correlation data obtained for each one of a plurality of different particle sizes. Here, for reasons of convenience, three sets of particle number-light intensity correlation data obtained using known samples having particle sizes of at least 500 nm, 10 nm, and 1 µm are stored.

Figure 5:
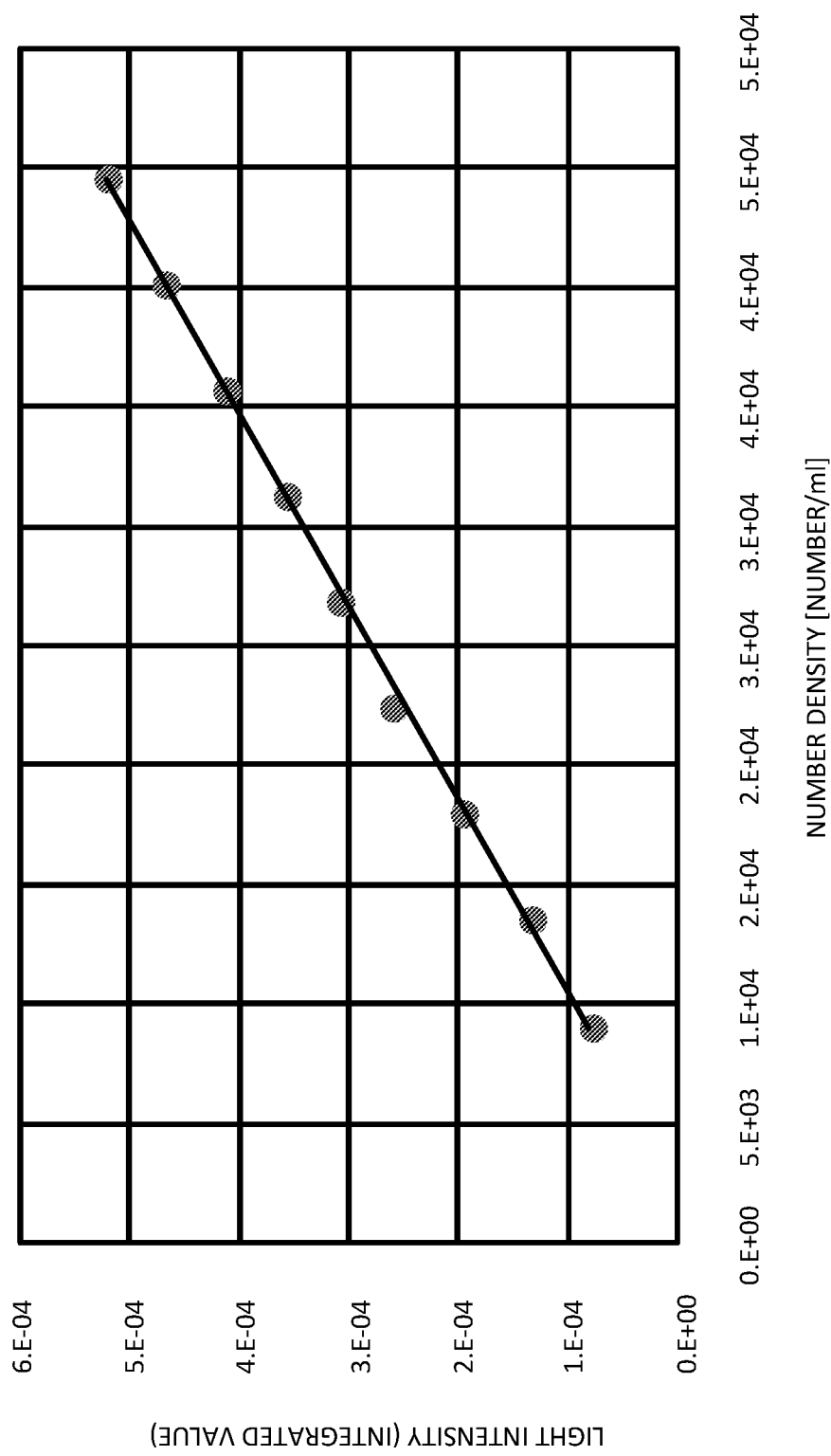
FIG. 5 is a graph showing experiment results used to determine particle number-light intensity correlation data according to the same embodiment.

Here, the experiment results used to determine in advance the above-described particle number-light intensity correlation data are shown in FIG. 5.

In this experiment, polystyrene latex spheres (PSL) having a particle size of 10 µm were used as the known sample, and nine types of known samples having mutually different number densities were used.

FIG. 5 shows a graph obtained by plotting integrated values of the light intensity distribution obtained by irradiating light onto each test sample, and the respective number densities thereof.

From these experiment results, it can be seen that a highly linear correlation exists between the number of particles and the light intensity distribution integrated values.

The specific particle size light intensity calculation unit 25 calculates a light intensity generated by particles having a specific particle size that are contained in the object X being measured based on the above-described actual light intensity distribution data and ideal light intensity distribution data. Note that the 'particles having a specific particle size' referred to here are not limited to particles having a particular particle size (for example, 500 nm), and may also be particles whose particle size is contained within a specific range (for example, 450 nm to 550 nm).

Figure 6:
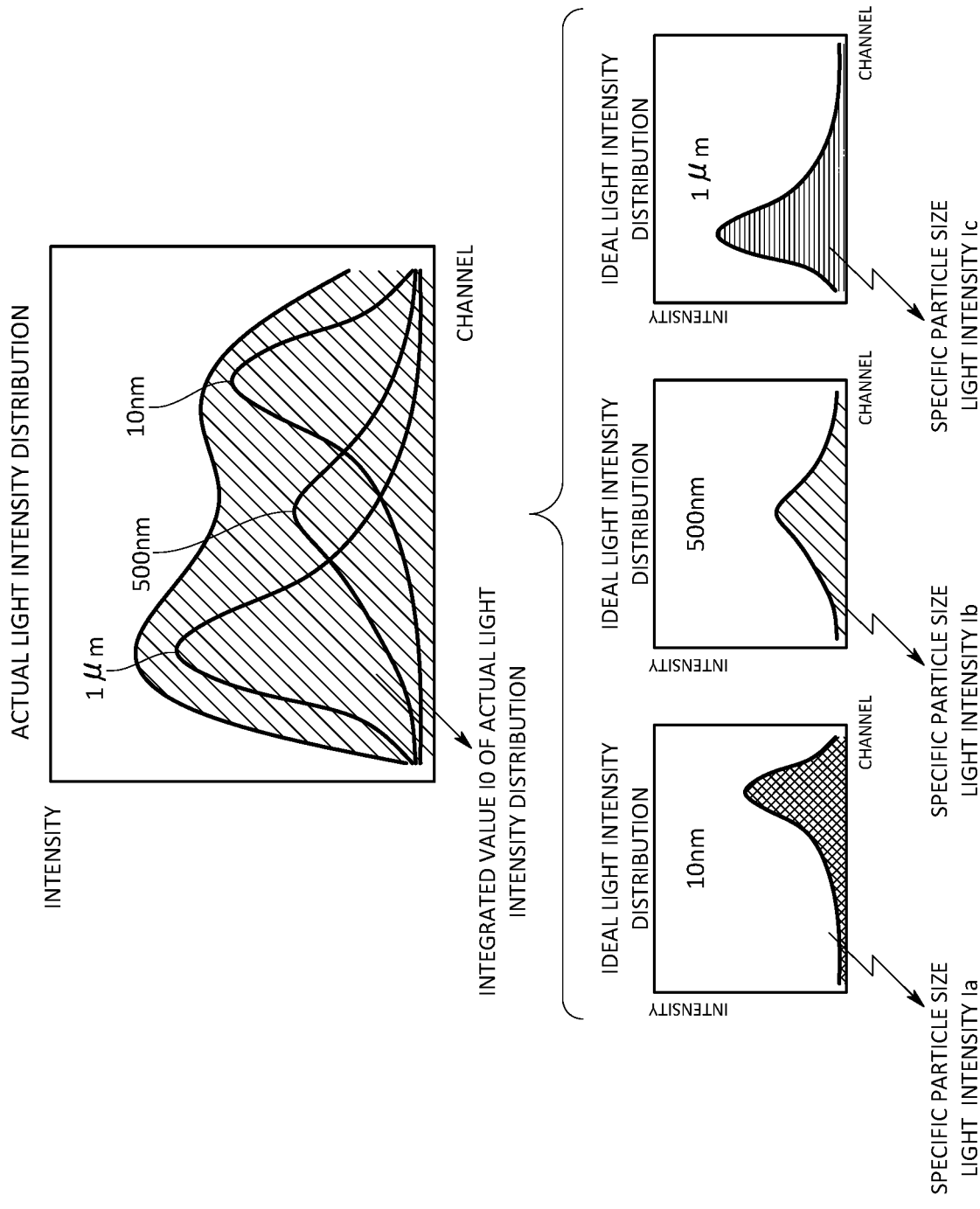
FIG. 6 is a typical view illustrating functions of a specific particle size light intensity calculation unit according to the same embodiment.

Here, as is shown in FIG. 6, the actual light intensity distribution may be considered as being the superimposed ideal light intensity distributions corresponding to various particle sizes. In other words, ideal light intensity distribution data sets corresponding to a plurality of different particle sizes are contained in a certain proportion in the actual light intensity distribution data.

For this reason, the specific particle size light intensity calculation unit 25 multiples the aforementioned proportion by an integrated value of 10 for the ideal light intensity distribution, so as to calculate the light intensity that is dependent on particles having a specific particle size (hereinafter, referred to as a specific particle size light intensity integrated value). In other words, as is shown in FIG. 6, the specific particle size light intensity calculation unit 25 calculates the integrated value of the ideal light intensity distributions of specific particle sizes contained in the actual light intensity distribution as the specific particle size light intensity distribution. More specifically, here, the frequency calculated by the particle size distribution calculation unit 23 is used as the aforementioned proportion, and a value obtained by multiplying the frequency of the specific particle size by the integrated value 10 for the light intensity distribution is used as the specific particle size light intensity integrated value.

Note that the integrated value of the actual light intensity distributions is not always limited to being a value obtained by integrating the light intensities over all the channels, and may instead be a value obtained by integrating the light intensities over a portion of the channels (i.e., channels located in a position where the spread angle is smaller or greater than a first bottom), or a value obtained by integrating the light intensities after excluding channels in which noise is generated.

The particle number calculation unit 26 calculates the number of particles having a specific particle size contained in the object X being measured based on the specific particle size light intensity integrated values calculated by the specific particle size light intensity calculation unit 25, and on the particle number-light intensity correlation data.

Figure 7:
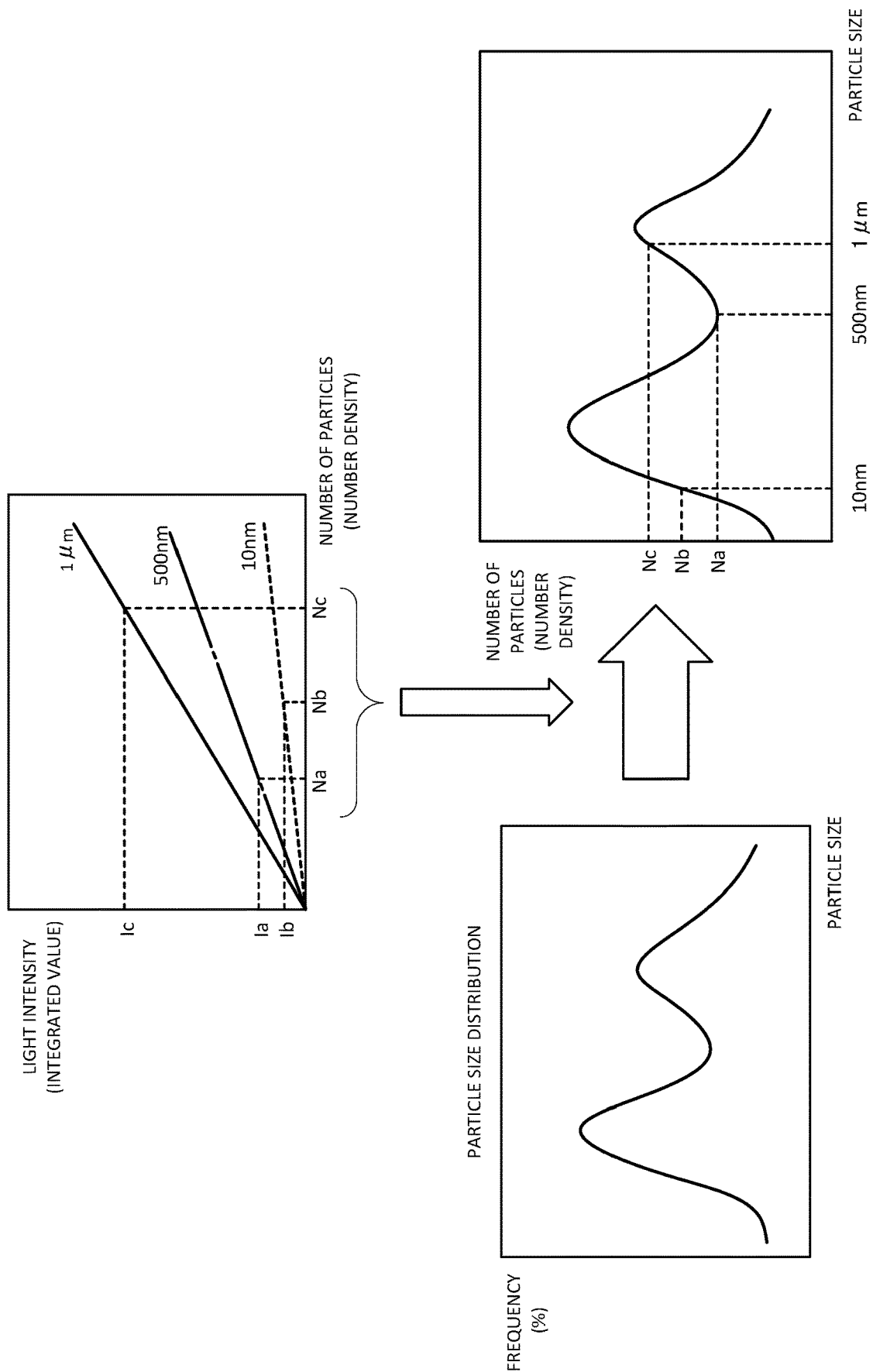
FIG. 7 is a typical view illustrating functions of a distribution conversion unit according to the same embodiment.

More specifically, as is shown in FIG. 7, if, for example, the specific particle size light intensity calculation unit 25 has calculated a specific particle size light intensity integrated value Ia generated by particles having a particle size of 500 nm that are contained in the object X being measured, the particle number calculation unit 26 determines a number of particles Na that corresponds to the specific particle size light intensity integrated value Ia using the particle number-light intensity correlation data obtained using known samples for a 500 nm particle size.

In the present embodiment, respective numbers of particles Na, Nb, and Nc having particle sizes of 500 nm, 10 nm, and 1 μm contained in the object X being measured are determined based on the respective specific particle size light intensity integrated values Ia, Ib, and Ic of the particle sizes 500 nm, 10 nm, and 1 μm.

Note that it is not essential for the particle number calculation unit 26 to calculate particle numbers of all of the different types of particle sizes, and it sufficient if the particle number of at least one type of particle size is calculated.

As is shown in FIG. 7, based on particle numbers calculated by the particle number calculation unit 26, and on the above-described particle size distribution data, the distribution conversion unit 27 converts a particle size distribution shown by the particle size distribution data from a distribution in which the number of particles of each particle size are shown in relative terms into a distribution in which the number of particles of each particle size are shown in absolute terms.

More specifically, the distribution conversion unit 27 converts the other axis in a distribution that shows the numbers of particles in relative terms from frequency (i.e., percentage) into particle number (i.e., number density). Additionally, the distribution configurations are transformed such that the number of particles set as this other axis are the same as the numbers of particles Na, Nb, and Nc of each particle size (in this case, 500 nm, 10 nm, and 1 μm) calculated by the particle number calculation unit 26. Note that the numbers of particles of particle sizes other than the particle sizes calculated by the particle number calculation unit 26 are calculated in this instance, for example, by interpolation.

As a result, a distribution in which the numbers of particles of each particle size are shown in relative terms is converted into a distribution in which the numbers of particles of each particle size are shown in absolute terms, and the particle size distribution after this conversion is then output, for example, to a display or the like.

It should be noted that, because the configuration of a light intensity distribution obtained by irradiating light onto particles changes depending on the refractive index of the particles, if the refractive indexes thereof are different, then the correlation between the integrated value of the light intensity distributions and the number of particles also changes.

Because of this, if the refractive index of the known sample used to obtain the particle number-light intensity correlation data is different from the refractive index of the object X being measured, then it cannot be said that this particle number-light intensity correlation data is suitable data for calculating the number of particles having a specific particle size that are contained in the object X being measured. Accordingly, if the number of particles is calculated using this particle number-light intensity correlation data, discrepancies will occur between the calculated number of particles and the number of particles actually contained in the object X being measured.

For this reason, as is shown in FIG. 2, the computation device 20 of the present embodiment is further provided with a function of a correlation data correction unit 28 that corrects the particle number-light intensity correlation data stored in the correlation data storage unit 24.

Figure 8:
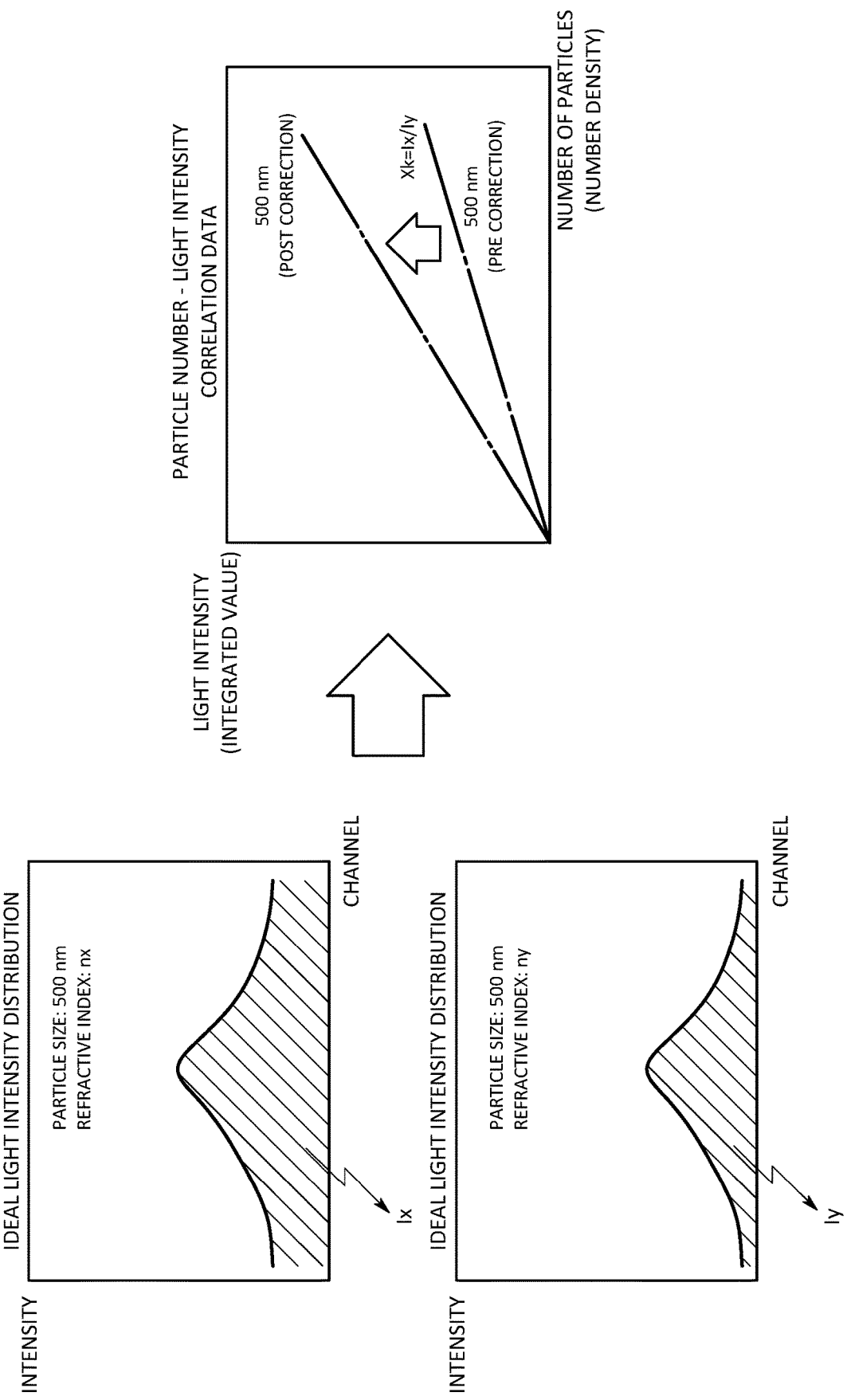
FIG. 8 is a typical view illustrating functions of a correlation data correction unit according to the same embodiment.

Hereinafter, a description will be given with reference to FIG. 8 of a case in which particle number-light intensity correlation data that has been determined in advance using, for example, a known sample of 500 nm is corrected, with the refractive index of the object X being measured taken as nx, and the refractive index of the known sample being taken as ny.

In this case, the correlation data correction unit 28 acquires from the ideal light intensity distribution storage unit 22 the refractive index nx of the object X being measured, and the ideal light intensity distribution data obtained using the particles having a particle size of 500 nm. The correlation data correction unit 28 then calculates an integrated value Ix of this ideal light intensity distribution.

In addition, the correlation data correction unit 28 calculates the refractive index ny of the known sample and an integrated value Iy of the ideal light intensity distribution obtained using the particles having a particle size of 500 nm.

Next, the correlation data correction unit 28 calculates a ratio k (=Ix/Iy) between the respective integrated values Ix and Iy.

The correlation data correction unit 28 then multiplies this ratio k by the light intensities for each particle number in the pre-correction particle number-light intensity correlation data determined in advance using the known sample of 500 nm, and stores the results as post-correction particle number-light intensity correlation data in the correlation data storage unit 24.

According to the particle size distribution measurement device 100 according to the present embodiment which has the above-described structure, because particle number-light intensity correlation data sets showing correlations between particle numbers and integrated values of light intensity distributions are determined in advance using known samples, it is possible to calculate the number of particles having a specific particle size (i.e., the number density) contained in an object X being measured based on this particle number-light intensity correlation data, and on the specific particle size light intensity integrated values.

In addition, by calculating the number of particles (i.e., the number density) in this way, using, for example, a conversion formula or the like, it is possible to ascertain absolute values relating to particles having a specific particle size such as the total number of particles having a specific particle size that are contained in the entire object X being measured, or the turbidity or volumetric density of particles having a specific particle size that are contained in the object X being measured.

Moreover, because the distribution conversion unit 27 converts a particle size distribution from a distribution in which the number of particles of each particle size are shown in relative terms into a distribution in which the number of particles of each particle size are shown in absolute terms, by confirming the particle size distribution after this conversion, it is possible to ascertain the overall number of particles of each particle size that are contained in the object X being measured.

Furthermore, because particle number-light intensity correlation data is determined in advance for each one of a plurality of different particle sizes, if at least one of these particles sizes matches the particle size of particles contained in the object X being measured, then it is possible to calculate the number of particles using the particle number-light intensity correlation data corresponding to that matching particle size. As a result, it becomes possible to deal flexibly with various different objects X being measured, and to measure the particle size distribution thereof.

Moreover, if it is possible to use a plurality of different sets of particle number-light intensity correlation data, then it is also possible to use all of the particle number-light intensity correlation data that can be used so as to more accurately calculate particle numbers and distributions in which the particle number are shown in absolute terms, and to use particle number-light intensity correlation data that corresponds to the closest particle size to a modal size (i.e., the most frequent size) of a particle size distribution in which the number of particles is shown in relative terms.

Moreover, because the correlation data correction unit 28 corrects the particle number-light intensity correlation data in accordance with differences between refractive indexes, even if the refractive index of the object X being measured is different from the refractive index of a known sample, it is still possible to calculate the number of particles by using the appropriate post-correction particle number-light intensity correlation data. As a result, any discrepancies occurring between the number of particles actually contained in an object X being measured and a calculated number of particles can be minimized, and an improvement in measurement accuracy can be achieved.

Note that the present invention is not limited to the above-described embodiment.

Figure 9:
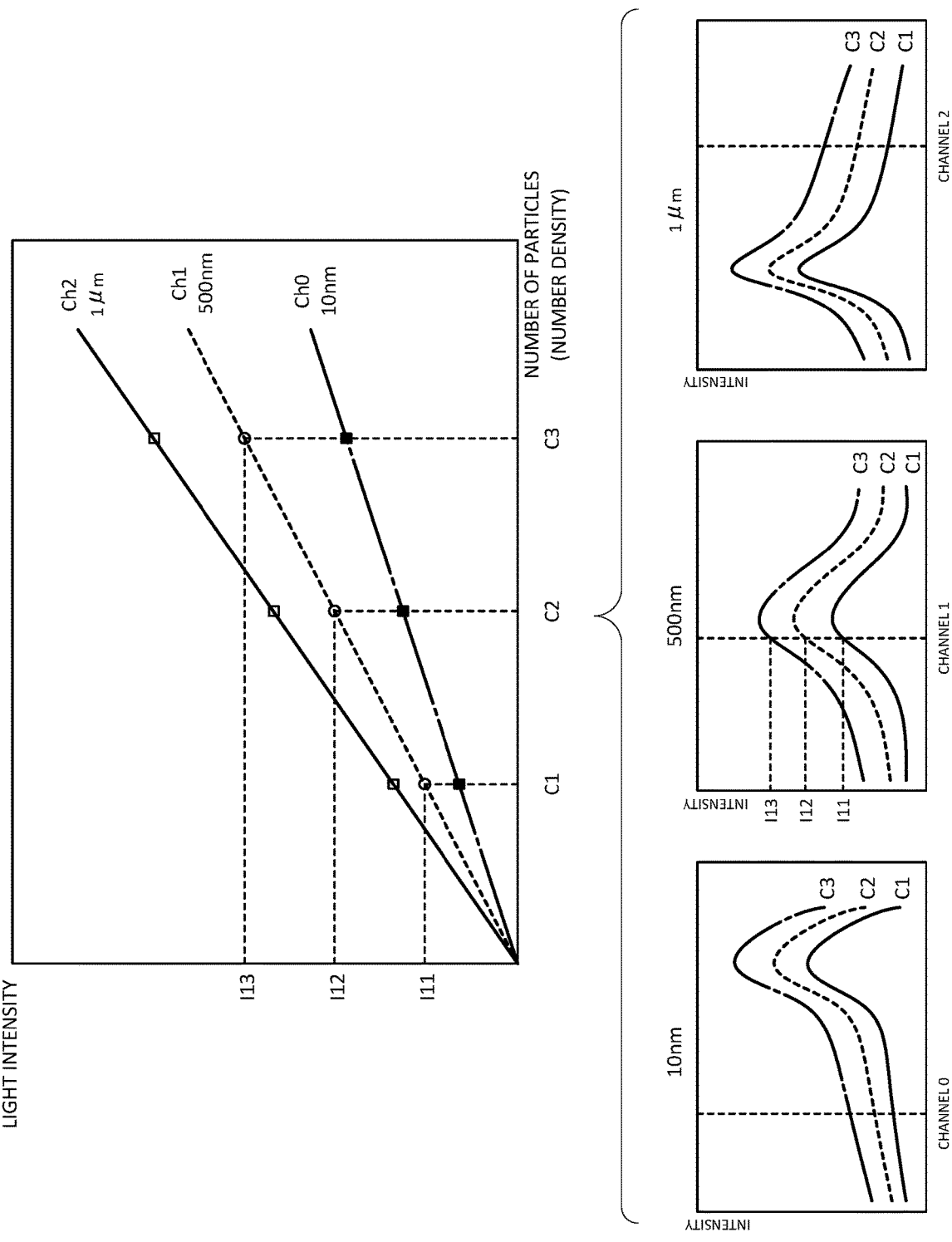
FIG. 9 is a typical view illustrating particle number-light intensity correlation data according to a variant embodiment.

For example, as is shown in FIG. 9, it is also possible for the particle number-light intensity correlation data to be data showing a correlation between the number of particles contained in a known sample and the light intensity of a specific spread angle in a light intensity distribution obtained from that known sample (in other words, the light intensity detected by the photodetector 14 of a specific channel). Note that the specific spread angle may be altered as is appropriate, for example, to a spread angle corresponding to a second peak or a first peak, or to a spread angle having the maximum light intensity, or the like.

As is shown in FIG. 9, this particle number-light intensity correlation data is determined in advance from actual light intensity distributions obtained by irradiating light onto a plurality of known samples that are formed by particles having the same particle size, and that each contain a different number of particles.

More specifically, light intensity distributions obtained, for example, by irradiating light onto each of three known samples having a particle size of 500 nm, and having particle numbers (i.e., number densities) of C1, C2, and C3 were measured. Light intensities I11, I12, and I13 of a specific channel (for example, Ch1) of these light intensity distributions, and the particle numbers (i.e., number densities) C1, C2, and C3 of each known sample were then plotted on a graph. The calibration curves obtained by this are included in the particle number-light intensity correlation data obtained using the known sample having a particle size of 500 nm.

Here, three calibration curves obtained using known samples having particle sizes of at least 500 nm, 10 nm, and 1 μm are stored as the particle number light intensity correlation data.

Figure 10:
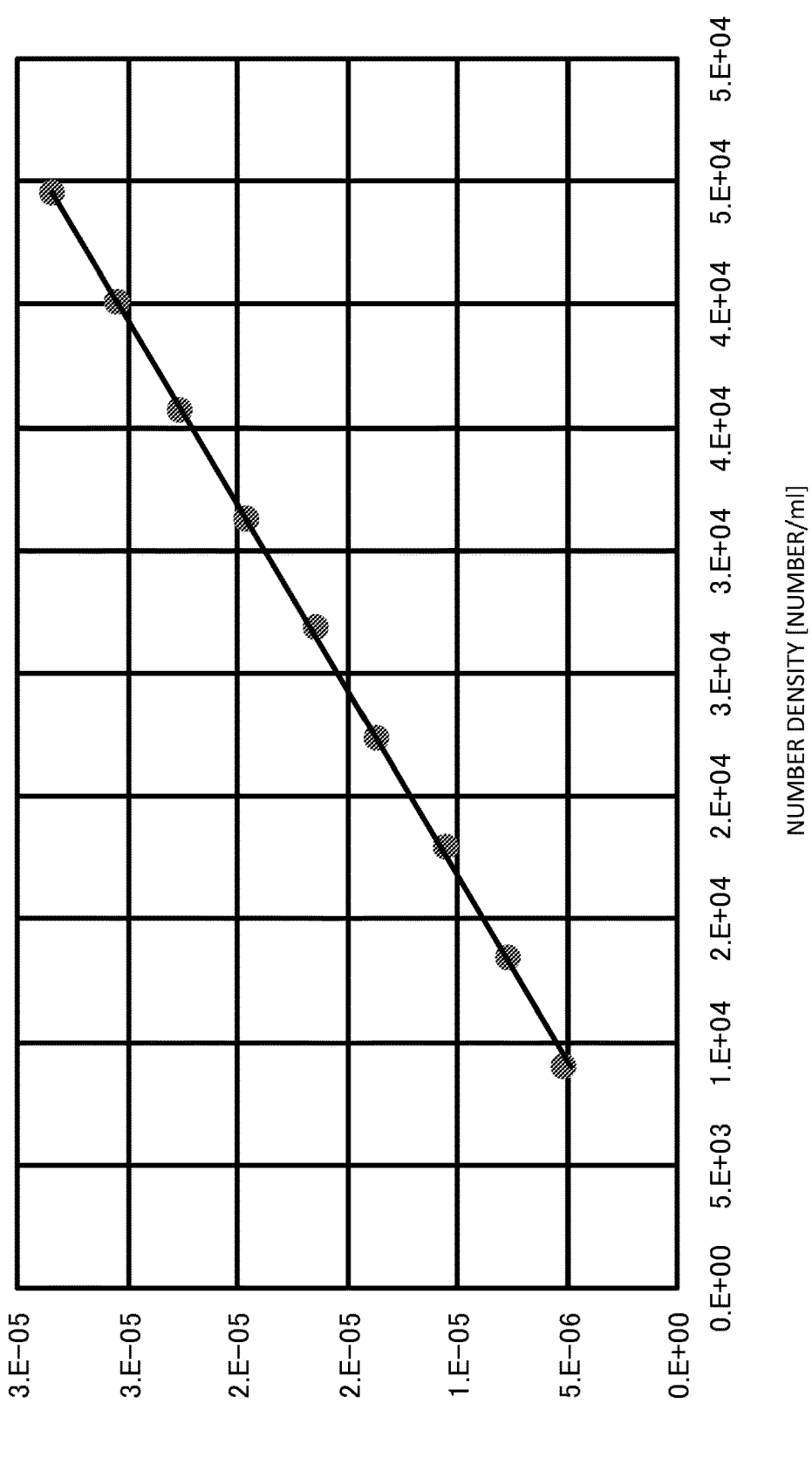
FIG. 10 is a graph showing experiment results used to determine particle number-light intensity correlation data according to the variant embodiment.

The experiment results used to determine in advance the above-described particle number-light intensity correlation data are shown in FIG. 10.

In this experiment, polystyrene latex spheres (PSL) having a particle size of 10 μm were used as the known sample, and nine types of known samples having mutually different number densities were used.

FIG. 10 shows a graph obtained by plotting the light intensities of a specific channel corresponding to 10 μm obtained by irradiating light onto each test sample, and the respective number densities thereof.

From these experiment results, it can be seen that a highly linear correlation exists between the number of particles and the light intensity of a specific channel.

If the above-described particle number-light intensity correlation data is used, the specific particle size light intensity calculation unit 25 obtains the light intensity of a channel that corresponds to a specific particle size in the actual light intensity distribution (for example, the channel corresponding to 500 nm is Channel 1) as the light intensity that is dependent on particles having a specific particle size (hereinafter, referred to as a specific particle size light intensity).

Thus, the particle number calculation unit 26 calculates the number of particles having a specific particle size contained in the object X being measured based on the specific particle size light intensity calculated by the specific particle size light intensity calculation unit 25, and on the particle number-light intensity correlation data.

Figure 11:
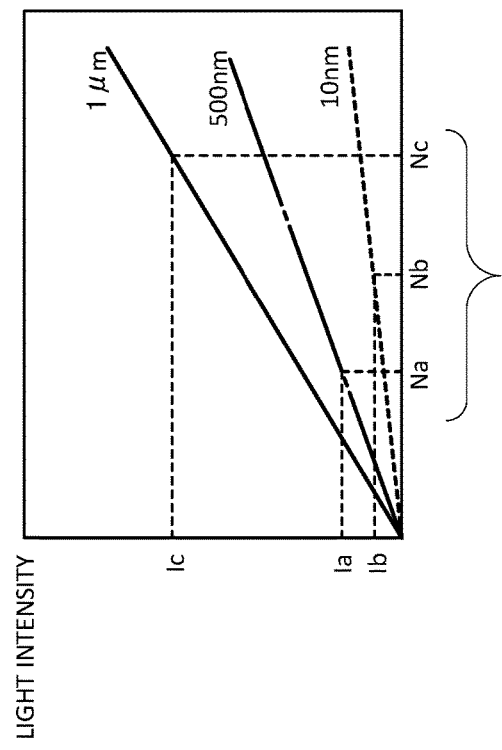
FIG. 11 is a typical view illustrating functions of a distribution conversion unit according to the variant embodiment.
Figure 11:
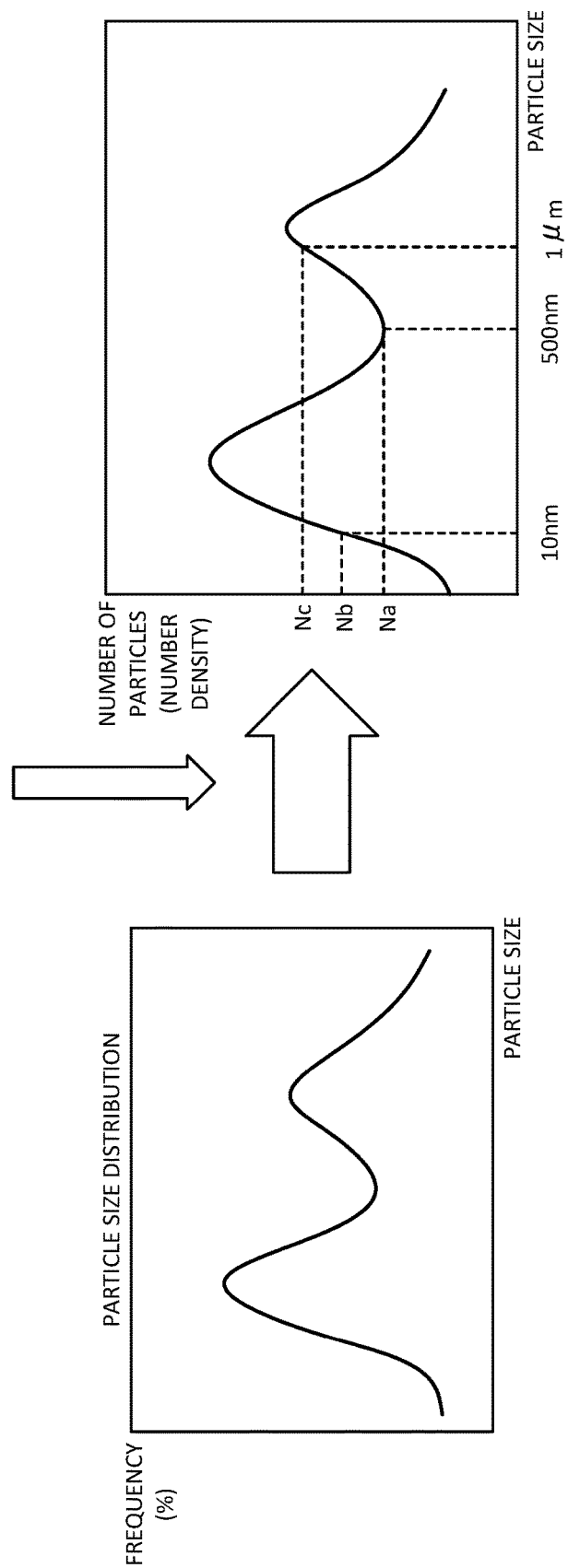

More specifically, as is shown in FIG. 11, if, for example, the specific particle size light intensity calculation unit 25 has calculated a specific particle size light intensity Ia generated by particles having a particle size of 500 nm that are contained in the object X being measured, the particle number calculation unit 26 determines the number of particles Na that corresponds to the specific particle size light intensity Ia using the particle number-light intensity correlation data obtained using known samples for a 500 nm particle size. Here, the respective numbers of particles Na, Nb, and Nc having particle sizes of 500 nm, 10 nm, and 1 μm contained in the object X being measured are determined based on the respective specific particle size light intensities Ia, Ib, and Ic of the particles having particle sizes of 500 nm, 10 nm, and 1 μm.

Next, in the same way as in the above-described embodiment, based on the particle numbers Na, Nb, and Nc calculated by the particle number calculation unit 26, and on the particle size distribution data, the distribution conversion unit 27 converts the particle size distribution shown by the particle size distribution data from a distribution in which the number of particles of each particle size are shown in relative terms into a distribution in which the number of particles of each particle size are shown in absolute terms.

Moreover, in the above-described embodiment, the particle size distribution is converted from a distribution in which the number of particles of each particle size are shown in relative terms into a distribution in which the number of particles of each particle size are shown in absolute terms, and is then output to a display or the like, however, it is not essential for the computation device 20 to be provided with a function as the distribution conversion unit 27. As an example of this, it is also possible for the particle number calculation unit 26 to calculate the number of particles having a specific particle size, and to output the resulting calculated number of particles to a display or the like.

Furthermore, in the above-described embodiment, the distribution conversion unit 27 converts a particle size distribution by using the plurality of particle numbers Na, Nb, and Nc, and by using interpolation to determine numbers of particles between these particle numbers Na, Nb, and Nc, however, it is also possible to transform a distribution in which the particle numbers are shown in relative terms into a distribution in which the particle numbers are shown in absolute terms using only a single particle number.

In addition, in the above-described embodiment, the correlation data correction unit 28 corrects the particle number-light intensity correlation data based on the refractive index nx of the object X being measured, and the integrated value Ix of the ideal light intensity distribution obtained using the particle size, and on the refractive index ny of the known sample, and the integrated value Iy of the ideal light intensity distribution obtained using the particle size, however, it is also possible for the particle number-light intensity correlation data to be corrected based on ratios between, for example, the maximum light intensities of the above-described respective ideal light intensity distributions.

In addition to these, the present invention is not limited to the above described respective embodiments, and various portions of the structure of each embodiment may also be combined together. Furthermore, various other modifications and the like may be made thereto insofar as they do not depart from the spirit or scope of the present invention.

INDUSTRIAL APPLICABILITY

According to the present invention, it is possible to provide a particle size distribution measurement device that makes it possible to ascertain an absolute number of particles having a particular particle size that are contained in an object being measured.

What is claimed is:

1. A particle size distribution measurement device that irradiates light onto a particles serving as an object being measured, and calculates a particle size distribution of the particles based on a light intensity signal that shows a light intensity of diffracted/scattered light therefrom, comprising:
    a computer with a hardware processor that calculates a light intensity generated by particles having a specific particle size that are contained in the object being measured based on an actual light intensity distribution obtained from the light intensity signal, and on a theoretical light intensity distribution calculated from the particle size;
    the computer comprising a correlation data storage memory that stores particle number-light intensity correlation data which is data obtained using a plurality of known samples in which the number of particles having a specific particle size is known, and which shows a correlation between the number of particles having a specific particle size that are contained in each of the known samples, and integrated values of the light intensity distributions obtained from each of the known samples; and
    wherein the hardware processor calculates the number of particles having a specific particle size that are contained in the object being measured based on the calculated light intensities, and on the particle number-light intensity correlation data.

2. The particle size distribution measurement device according to claim 1, wherein the hardware processor, based on the calculated number of particles having a specific particle size, converts the particle size distribution from a distribution in which the numbers of particles of each particle size contained in the object being measured are shown in relative terms to a distribution in which the numbers of these particles are shown in absolute terms.

3. The particle size distribution measurement device according to claim 1, wherein the correlation data storage memory stores the particle number-light intensity correlation data obtained for each one of a plurality of different types of particle size.

4. The particle size distribution measurement device according to claim 1, wherein the hardware processor, based on a theoretical light intensity distribution calculated using the particle sizes and refractive indexes of the known samples, and on a theoretical light intensity distribution calculated using the same particle sizes as the known samples, but using different refractive indexes therefrom, corrects the particle number-light intensity correlation data.

5. The particle size distribution measurement device according to claim 1, wherein the object being measured is formed by foam particles contained in a liquid.

6. A non-transitory computer-readable medium storing a computer program for a particle size distribution measurement device that is installed in a particle size distribution measurement device that irradiates light onto a particles serving as an object being measured, and calculates a particle size distribution of the particles based on a light intensity signal that shows a light intensity of diffracted/scattered light therefrom, wherein
    the program causes a computer with a hardware processor and a correlation data storage memory to:
    calculate a light intensity generated by particles having a specific particle size that are contained in the object being measured based on an actual light intensity distribution obtained from the light intensity signal, and on a theoretical light intensity distribution calculated from the particle size;
    store particle number-light intensity correlation data in the correlation data storage memory, the particle number-light intensity correlation data being data obtained using a plurality of known samples in which the number of particles having a specific particle size is known, and which shows a correlation between the number of particles having a specific particle size that are contained in each of the known samples, and integrated values of the light intensity distributions obtained from each of the known samples; and
    calculate the number of particles having a specific particle size that are contained in the object being measured based on the calculated light intensities, and on the particle number-light intensity correlation data.

7. A particle size distribution measurement device that irradiates light onto a particles serving as an object being measured, and calculates a particle size distribution of the particles based on a light intensity signal that shows a light intensity of diffracted/scattered light therefrom, comprising:
    a computer with a hardware processor that calculates a light intensity generated by particles having a specific particle size that are contained in the object being measured based on an actual light intensity distribution obtained from the light intensity signal, and on a theoretical light intensity distribution calculated from the particle size;
    the computer comprising a correlation data storage memory that stores particle number-light intensity correlation data which is data obtained using a plurality of known samples in which the number of particles having a specific particle size is known, and which shows a correlation between the number of particles having a specific particle size that are contained in each of the known samples, and a light intensity of a specific spread angle in a light intensity distribution obtained from each of the known samples; and
    wherein the hardware processor calculates the number of particles having a specific particle size that are contained in the object being measured based on the calculated light intensities, and on the particle number-light intensity correlation data.

8. A non-transitory computer-readable medium storing a computer program for a particle size distribution measurement device that is installed in a particle size distribution measurement device that irradiates light onto a particles serving as an object being measured, and calculates a particle size distribution of the particles based on a light intensity signal that shows a light intensity of diffracted/scattered light therefrom, wherein the program causes a computer with a hardware processor and a correlation data storage memory to:

calculate a light intensity generated by particles having a specific particle size that are contained in the object being measured based on an actual light intensity distribution obtained from the light intensity signal, and on a theoretical light intensity distribution calculated from the particle size;

store particle number-light intensity correlation data in the correlation data storage memory, the particle number-light intensity correlation data being data obtained using a plurality of known samples in which the number of particles having a specific particle size is known, and which shows a correlation between the number of particles having a specific particle size that are contained in each of the known samples, and a light intensity of a specific spread angle in a light intensity distribution obtained from each of the known samples; and calculate the number of particles having a specific particle size that are contained in the object being measured based on the calculated light intensities, and on the particle number-light intensity correlation data.

* * * * *